(12) United States Patent
Regev et al.

(10) Patent No.: US 10,652,045 B2
(45) Date of Patent: May 12, 2020

(54) COMPUTERIZED APPARATUS WITH A HIGH SPEED DATA BUS

(71) Applicant: MICRON TECHNOLOGY, INC., Boise, ID (US)

(72) Inventors: Zvi Regev, West Hills, CA (US); Alon Regev, Woodland Hills, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 81 days.

(21) Appl. No.: 15/871,699

(22) Filed: Jan. 15, 2018

(65) Prior Publication Data

US 2018/0198642 A1 Jul. 12, 2018

Related U.S. Application Data

(60) Continuation of application No. 15/402,055, filed on Jan. 9, 2017, now Pat. No. 9,871,672, which is a continuation of application No. 14/860,473, filed on Sep. 21, 2015, now Pat. No. 9,544,164, which is a division of application No. 14/307,580, filed on Jun. 18, 2014, now Pat. No. 9,160,561, which is a continuation of application No. 12/961,262, filed on Dec. 6, 2010, now Pat. No. 8,787,397, which is a continuation of application No. 11/529,632, filed on Sep. 29, 2006, now Pat. No. 7,869,457, which is a division of application No. 10/190,554, filed on Jul. 9, 2002, now Pat. No. 7,280,549.

(Continued)

(51) Int. Cl.
*H04L 12/42* (2006.01)

(52) U.S. Cl.
CPC ............ *H04L 12/422* (2013.01); *H04L 12/42* (2013.01)

(58) Field of Classification Search
CPC .............................. H04L 12/42; H04L 12/422
See application file for complete search history.

(56) References Cited

U.S. PATENT DOCUMENTS 4,661,952 A 4/1987 von Sichart et al.
4,845,709 A 7/1989 Matsumoto et al.
(Continued)

OTHER PUBLICATIONS

MOST, MAMAC Specification, Rev 1.1, Dec. 2003.
(Continued)

*Primary Examiner* — Chi Ho A Lee
(74) *Attorney, Agent, or Firm* — Gazdzinski & Associates, PC

(57) ABSTRACT

A computerized apparatus configured for high-speed data transactions between components thereof. In one embodiment, the computerized apparatus includes a high-speed ring data bus apparatus with a plurality of nodes, and associated application apparatus in data communication with at least one of the nodes. A synchronous ring protocol is used to transfer data packets or frames around the ring data bus, so as to avoid data collisions. The packets or frames include both payload and control data, and may be addressed to higher layer processes of the application apparatus. In one variant, differentially signaled optical or electrical bus segments are utilized to interface with the nodes, and data is serialized before transmission on the ring data bus. In another variant, a common clock signal is transmitted around the ring with the data packets or frames.

43 Claims, 11 Drawing Sheets

Related U.S. Application Data

(60) Provisional application No. 60/303,719, filed on Jul. 9, 2001.

(56) References Cited

U.S. PATENT DOCUMENTS

| | | | |
|---|---|---|---|
| 4,982,185 A | 1/1991 | Holmberg et al. | |
| 5,119,373 A | 6/1992 | Fredricsson et al. | |
| 5,206,857 A | 4/1993 | Farleigh | |
| 5,249,201 A | 9/1993 | Posner et al. | |
| 5,283,785 A | 2/1994 | Ferguson | |
| 5,301,185 A | 4/1994 | Cherry | |
| 5,440,557 A | 8/1995 | Brief | |
| 5,469,166 A | 11/1995 | Regev | |
| 5,504,782 A | 4/1996 | Campbell, Jr. | |
| 5,668,830 A | 9/1997 | Georgiou et al. | |
| 5,701,447 A | 12/1997 | Hahn | |
| 5,778,188 A | 7/1998 | Taniguchi et al. | |
| 5,841,974 A | 11/1998 | Krone et al. | |
| 5,872,959 A * | 2/1999 | Nguyen | G06F 13/4217 710/305 |
| 5,886,992 A * | 3/1999 | Raatikainen | H04L 12/43 370/410 |
| 5,974,056 A * | 10/1999 | Wilson | H04L 12/417 370/509 |
| 6,122,680 A | 9/2000 | Holm et al. | |
| 6,144,675 A | 11/2000 | Wakabayashi et al. | |
| 6,237,042 B1 * | 5/2001 | Kolb | H04L 41/26 709/251 |
| 6,343,331 B1 | 1/2002 | Stirling | |
| 6,377,998 B2 | 4/2002 | Noll et al. | |
| 6,421,710 B1 | 7/2002 | Jasperneite et al. | |
| 6,618,455 B1 | 9/2003 | Maeda et al. | |
| 6,747,954 B1 | 6/2004 | Petersen et al. | |
| 6,747,985 B1 | 6/2004 | Lovette | |
| 6,775,271 B1 | 8/2004 | Johnson et al. | |
| 6,839,393 B1 | 1/2005 | Sidiropoulos | |
| 6,839,862 B2 | 1/2005 | Evoy et al. | |
| 6,959,358 B2 | 10/2005 | Regev et al. | |
| 6,975,674 B1 | 12/2005 | Phanse et al. | |
| 7,266,123 B1 | 9/2007 | Johnson et al. | |
| 7,280,549 B2 | 10/2007 | Regev et al. | |
| 7,869,457 B2 | 1/2011 | Regev et al. | |
| 8,787,397 B2 | 7/2014 | Regev et al. | |
| 2001/0052803 A1 | 12/2001 | Ozawa | |
| 2002/0075886 A1 * | 6/2002 | Tagore-Brage | H04L 12/42 370/424 |
| 2002/0097749 A1 | 7/2002 | Homer et al. | |
| 2002/0101777 A1 | 8/2002 | Anand et al. | |
| 2002/0120885 A1 * | 8/2002 | Choi | G06F 8/65 714/38.1 |
| 2002/0184552 A1 | 12/2002 | Evoy et al. | |
| 2003/0100961 A1 | 5/2003 | Monse et al. | |
| 2003/0161303 A1 | 8/2003 | Mehrvar et al. | |
| 2004/0008720 A1 | 1/2004 | Wang et al. | |
| 2004/0042542 A1 | 3/2004 | Kawada et al. | |
| 2004/0081145 A1 * | 4/2004 | Harrekilde-Petersen | H04L 12/43 370/362 |
| 2004/0100954 A1 | 5/2004 | Dai et al. | |
| 2006/0209847 A1 | 9/2006 | Binder | |
| 2006/0276913 A1 | 12/2006 | Pearce et al. | |

OTHER PUBLICATIONS

MOST, MOST Core Compliance Test Specification, Rev 1V2, Dec. 2006.
MOST, MOST Dynamic Specification, Rev 1.3, Dec. 2006.
MOST, MOST Dynamic Specification, Rev 3.0.2, Oct. 2012.
MOST, MOST Specification, Rev 2.5, Oct. 2006.
MOST, MOST Specification, Rev 3.0 E2, Jul. 2010.
MOST, MOST Specification, Rev 3.0 E2, Jul. 2010 (in Japanese).
MOST, MOST Specification, Rev 2.3, Aug. 2004 (in Japanese).
MOST, The Automotive Multimedia Network, From MOST25 to MOST150, ed. Dr. Ing. Andreas Grzemba, copyright 2011.

* cited by examiner

COMPUTERIZED APPARATUS WITH A HIGH SPEED DATA BUS

PRIORITY AND CROSS REFERENCE TO RELATED APPLICATIONS

This patent application is a continuation of and claims the benefit or priority to co-pending U.S. patent application Ser. No. 15/402,055 of the same title, filed Jan. 9, 2017, now U.S. Pat. No. 9,871,672, which is a continuation of and claims the benefit of priority to co-owned U.S. patent application Ser. No. 14/860,473 of the same title, filed Sep. 21, 2015, now U.S. Pat. No. 9,544,164, which is a divisional of and claims the benefit of priority to co-owned U.S. patent application Ser. No. 14/307,580 entitled "High Speed Ring/Bus" filed Jun. 18, 2014, now U.S. Pat. No. 9,160,561, which is a continuation of and claims the benefit of priority to co-owned U.S. patent application Ser. No. 12/961,262 of the same title filed Dec. 6, 2010, now U.S. Pat. No. 8,787,397, which is a continuation of and claims the benefit of priority to U.S. patent application Ser. No. 11/529,632 of the same title filed Sep. 29, 2006, now U.S. Pat. No. 7,869,457, which is a divisional of and claims the benefit of priority to U.S. patent application Ser. No. 10/190,554 of the same title filed Jul. 9, 2002, now U.S. Pat. No. 7,280,549, which claims the benefit of priority to U.S. Provisional Patent Application Ser. No. 60/303,719 of the same title filed Jul. 9, 2001, each of the foregoing being incorporated herein by reference in its entirety.

FIELD OF THE INVENTION

The present invention relates generally to data communications systems, and particularly to a high speed data bus architecture.

BACKGROUND OF THE INVENTION

Modern digital and communications and processing systems rely on the rapid communication of digital data between components and subsystems. This communication of digital data has been effected using a wide variety of data bus architectures. Typically, wide parallel bus architectures have been used for short-distance communications of high-speed data, as in digital processors and system backplanes. Where data is to be communicated over longer distances, serial data bus architectures, such as Ethernet, have proven effective. Busses operating under the control of a master controller are known in the art, as are peer-to-peer networks. There is, however, an opportunity to improve the performance of many systems by the introduction of a superior high-speed data bus architecture.

BRIEF SUMMARY OF THE INVENTION

In a first aspect, a computerized high-speed ring data bus apparatus is disclosed. In one embodiment, the computerized apparatus includes: a plurality of computerized nodes; a plurality of data bus segments connecting each of the plurality of computerized nodes with two other of the plurality of computerized nodes so as to form a first data transport ring over which data can be communicated, at least one of the plurality of computerized nodes configured to generate a synchronization signal to which at least each of the other of the plurality of computerized nodes synchronize; and at least one application apparatus in data communication with at least one of the plurality of computerized nodes. In one implementation, the computerized high-speed ring data bus apparatus is configured such that the data can be communicated over the first data transport ring by each of the plurality of computerized nodes to each other of the plurality of computerized nodes; and the at least one computerized node is further configured to cause transmission of the generated synchronization signal over the first data transport ring for use by at least each of the other computerized nodes.

In a second aspect, computerized apparatus for use in a synchronous data ring network is disclosed. In one embodiment, the computerized apparatus includes: an application apparatus having: a plurality of data bus interfaces; and computerized logic in data communication with the plurality of data bus interfaces and configured to generate data packets comprised of one or more of payload data, address data, and control data and cause transmission of the generated data packets via one or more of the plurality of data bus interfaces; and computerized interface and control (IC) apparatus in data communication with the plurality of data bus interfaces and configured to at least provide a data interface between the application apparatus and a data transport ring of the synchronous data ring network.

In one implementation, the computerized IC apparatus includes: at least one receive port in data communication with a first data bus segment of the data transport ring, the at least one receive port configured to receive serialized data transmitted over the first data bus segment; and at least one transmit port in data communication with a second data bus segment of the data transport ring, the at least one transmit port configured to transmit serialized data over the second data bus segment.

In one variant, the computerized IC apparatus is further configured to receive transmitted ones of the generated data packets, and utilize the one or more of the payload data, address data, and control data of the received generated packet data structures to generate one or more synchronous frame structures for transmission via the at least one transmit port.

In another aspect, a method of processing data within a computerized ring network apparatus having a plurality of computerized nodes is disclosed. In one embodiment, the ring network apparatus includes a plurality of data bus segments connecting the plurality of computerized nodes to form a data transport ring, and an application apparatus in data communication with one of the computerized nodes, and the method includes: transmitting packet data from the application apparatus to the one computerized node via at least one data interface between the application apparatus and the one computerized node, the transmitted packet data comprising payload data, control data, and address data; processing the transmitted packet data to cause placement of the payload data, control data, and address data within respective ones of prescribed fields within at least one data frame structure; and causing transmission of at least a portion of the at least one data frame structure as a serialized bitstream over at least one of the data bus segments via at least one differentially signaled pair of optical or electrical conductors.

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 1:
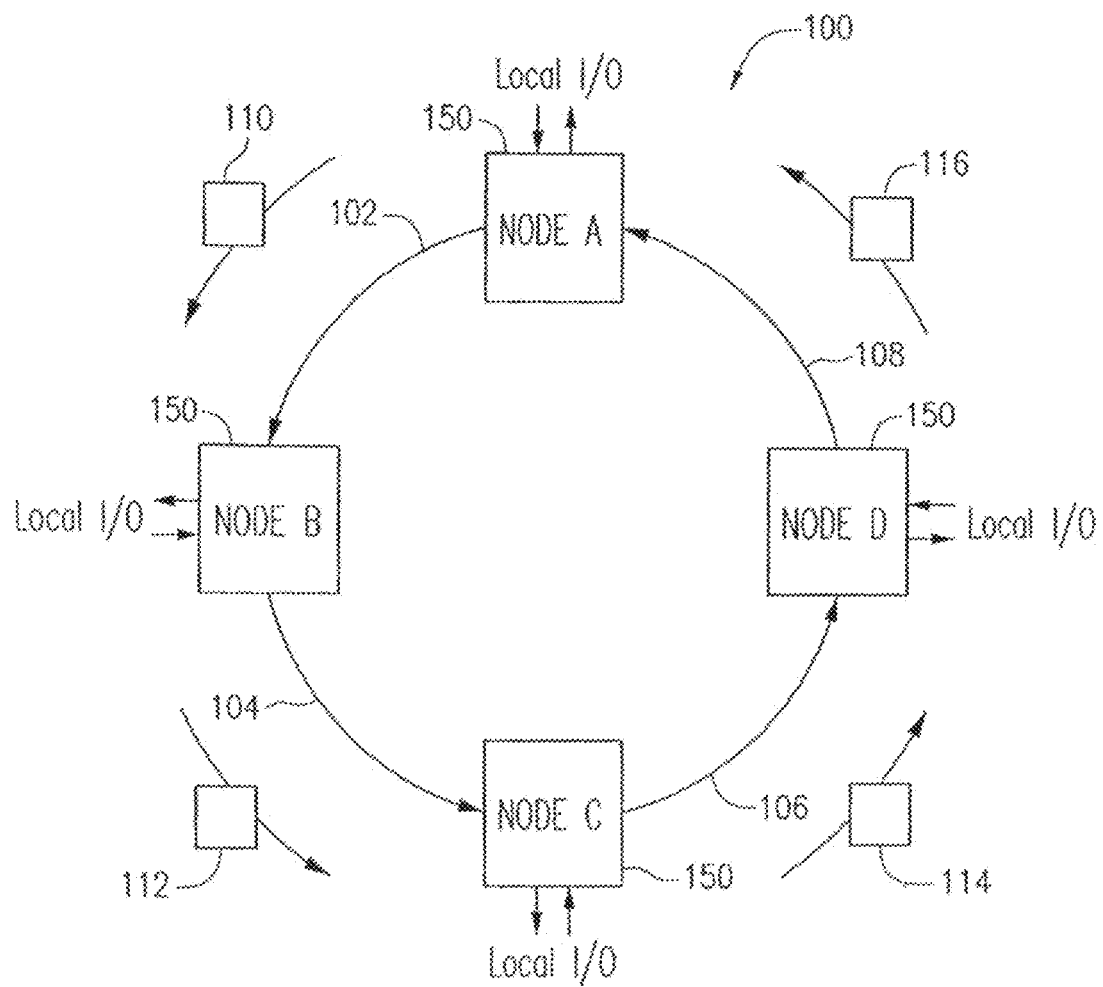
FIG. 1 shows a high speed bus according to one aspect of the invention.

FIG. 1 depicts a simplified block diagram of a high speed data bus system 100, in accordance with an exemplary embodiment of the invention. As shown, four nodes, A, B, C and D are coupled together by four respective media segments 102, 104, 106 and 108. In one aspect of the invention, each of the four nodes embodies similar structure, and provides correspondingly similar function. The nodes operate in a peer-to-peer relationship to one another inasmuch as no one node is a master to the entire bus. Data moves from node to node across the media segments in a single (here clockwise) direction. A wide variety of conventions may be employed with respect to data transmission. In the illustrated embodiments, the data is transmitted in discrete packets. Exemplary packets are shown being transmitted in FIG. 1. For example, packet 110 is shown being transmitted from node A to node B, packet 112 is shown being transmitted from node B to node C; packet 114 is shown being transmitted from node C to node D; and packet 116 is shown being transmitted from node D to node A. It should be noted that, according to one aspect of the invention, packets 110, 112, 114 and 116 represent completely different messages transmitted simultaneously over different media segments of the data bus.

Figure 2:
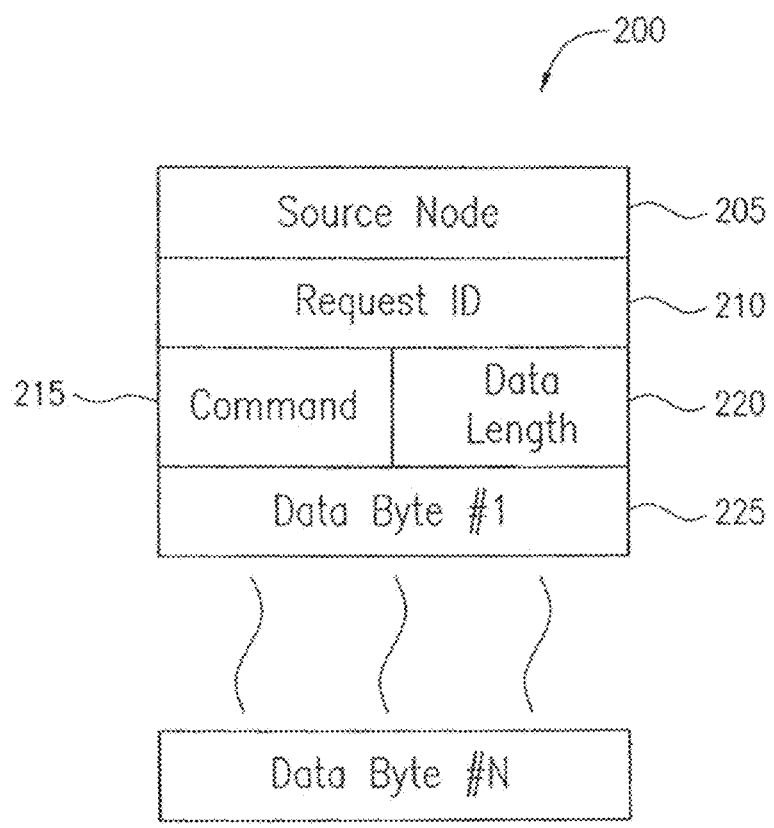
FIG. 2 shows an exemplary data packet structure for transmission on the high speed bus.

FIG. 2 depicts an exemplary packet structure 200 used in the high speed data bus system 100 of FIG. 1. The exemplary packet structure shown is adapted for use in a distributed Content Accessible Memory (CAM) system, as described in copending patent application Ser. No. 10/179,383. For purposes of simplicity, the packet structure 200 is depicted as containing five fields. A first field is a source node (or origin) field 205. The source node field 205 identifies the CAM from which the command was originally issued and to which CAM the result must be returned.

A second field of the packet structure 200 is the request identification field 210. The request identification field 210 contains the identification for a particular command originated at a local node. The request identification field 210 is used to associate a command with a response received from one of the CAMs. The response contains the same request identification as the original command. Alternatively, the request identification can be viewed as an identification number of the packet.

The third field of the packet structure 200 is a command field 215. The command contained therein is selected from a command set pre-defined for use in a particular application.

The fourth field of the packet structure 200 is the data length field 220. The data length field 220 indicates the number of data bytes in the packet. The data 225 itself is also included in the packet structure 200 as the fifth field. Generally, the amount of data contained in the packet structure 200 is command and implementation dependent.

Figure 3:
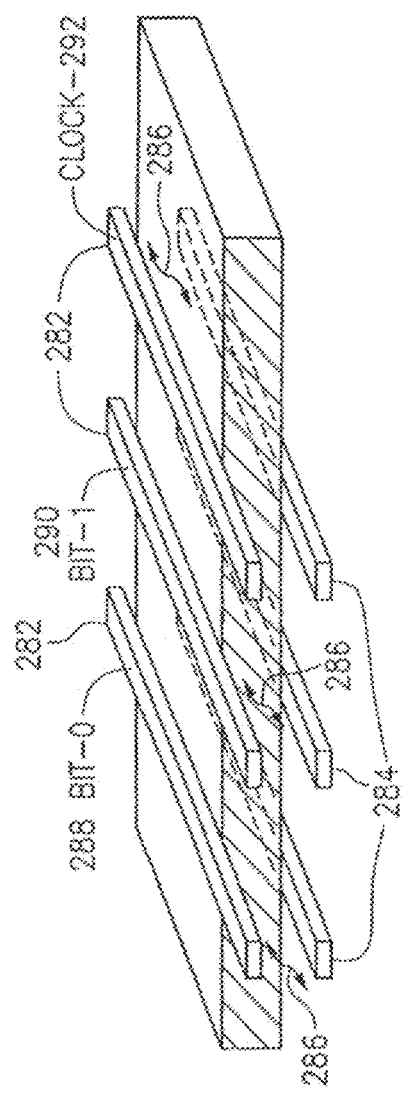
FIG. 3 shows a portion of an exemplary media segment showing three strip-line transmission lines.

FIG. 3 shows a portion of an exemplary media segment, according to one aspect of the invention. The media segment 280 includes three strip-line T-lines, of a form known in the art. Each transmission line includes respective first 282 and second 284 conductors disposed in substantially parallel spaced relation to one another on respective opposite sides of a respective dielectric region 286. The embodiment shown includes two T-lines allocated to the transmission of data (bit-0 288 and bit-1 290) and a third T-line 292 allocated to carry a high speed clock signal. As is discussed in further detail below, the presence of the separate clock line 292 is optional, as is the number of data transmission T-lines. Although the embodiment shown includes strip line conductors, other media such as coaxial cable, microwave wave-guides, optical fibers, coherent free-space transmission, or other media formats known in the art, may be used alone or in combination.

Figure 4:
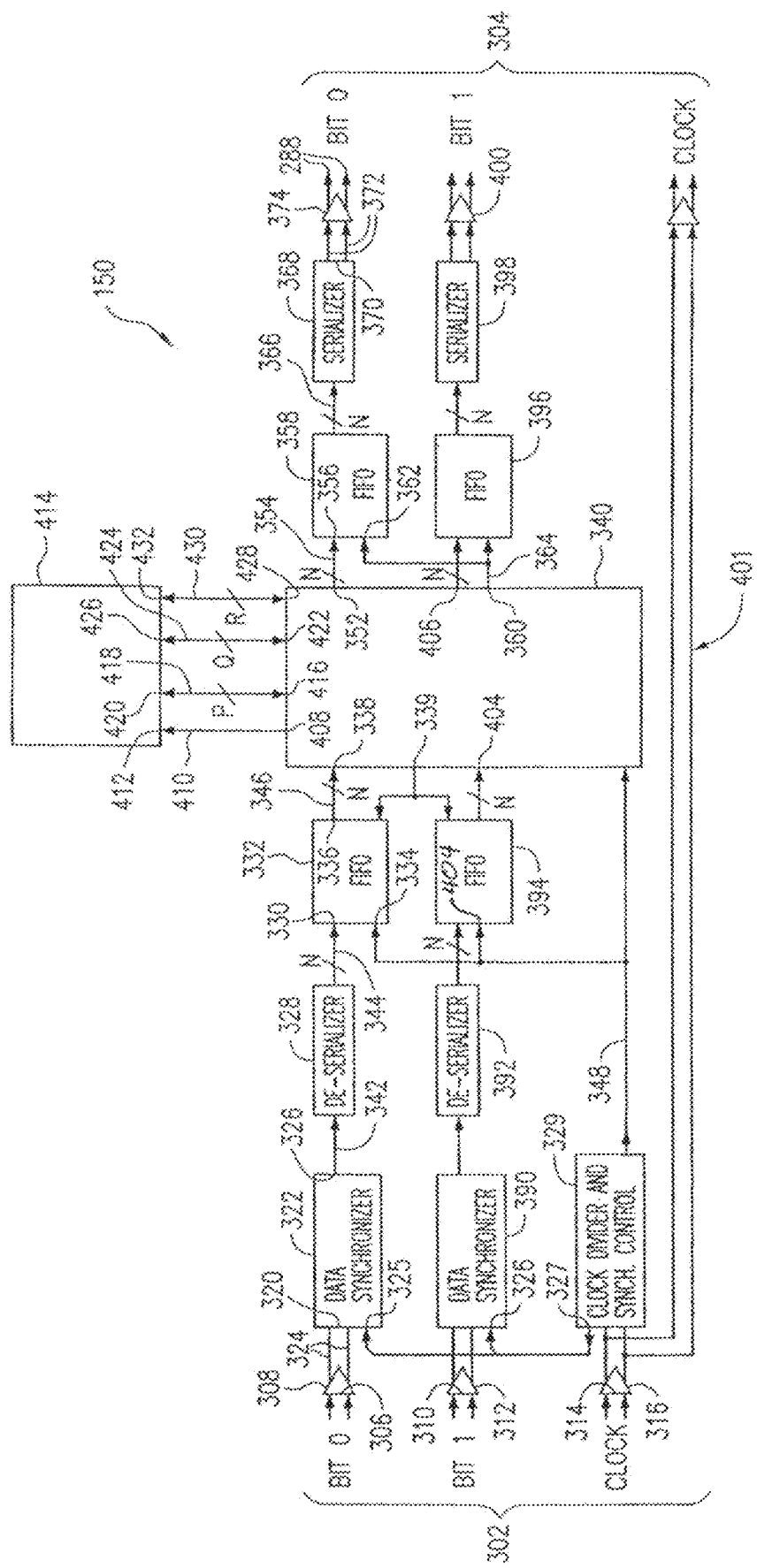
FIG. 4 shows a portion of an exemplary bus node in block-diagram form according to one aspect of the invention.

FIG. 4 shows an exemplary node 150 of a high speed data bus system, in block diagram form. One preferred embodiment of the invention is shown, in which the data path of the high speed media is 2 bits wide (bit 0, bit 1). In other preferred embodiments, the data path is 8, 16 or 32 bits wide. Other data widths may be routinely selected, depending on the technical demands of a particular application.

The node 150 includes an input port 302 and an output port 304. The input port includes a first differential amplifier input 306 of a first input amplifier 308 and a second differential input 310 of a second input amplifier 312. Also, included in the FIG. 4 embodiment is a third differential input 314 of a third input amplifier 316, where the third differential input is adapted to receive a high speed clock signal. Following the bit-0 data path through the node, one sees that the input amplifier 308 is coupled at a differential output to a first input 320 of a data synchronizer circuit 322. In the embodiment shown, this coupling is made by means of a differential signal line 324. The data synchronizer circuit 322 includes a signal input 325 coupled to a clock output 327 of a clock divider and synchronization control circuit 329 for receiving a first clock signal. However, single ended interconnections may be used instead of the differential, everywhere in the node.

The data synchronizer circuit 322 is coupled at an output 326 to an input of a deserializer circuit 328. An output of the deserializer circuit is coupled to a first input 330 of an input FIFO buffer circuit 332. The input FIFO buffer circuit 332 includes a further input 334 adapted to receive a second clock signal, and an output 336 coupled to a first input 338 of a formatter, interface and control (FIC) circuit 340.

The deserializer 328 is a demultiplexer that receives a single bit-wide input from line 342 and outputs a multi-bit-wide output on line 344. Thus, for example, if line 344 is 8-bits wide, 8 bits received in serial fashion at the input of the deserializer are output in parallel as a single 8-bit wide word at the output of the deserializer 328.

In this exemplary case, the input FIFO buffer 332 is 8-bits wide, corresponding to the width of the deserializer 328 output.

As is readily understood, the rate at which data is clocked out of the deserializer is slower than the rate at which it is clocked in by a factor equal to the ratio of output data width to input data width.

In the exemplary embodiment of FIG. 4, the coupling 342 between the data synchronizer circuit 322 and the deserializer circuit 328 is a single-ended signal line. So too, the coupling 344 between the deserializer and the FIFO input buffer and the coupling 346 between the FIFO input buffer and the FIC circuit 340 both include single-ended signal lines. Also, the second clock signal is shown to be conveyed within the node 150 on a single-ended signal line 348. One of skill in the art would routinely select single-ended and differential coupling lines for use within the system according to the demands of a particular application.

A first output 352 of FIC circuit 340 is coupled by a single-ended signal line 354 to a first input 356 of an output FIFO buffer 358. A third clock signal is coupled from a second output 360 of the FIC circuit 340 to a second (clock) input 362 of output FIFO buffer 358 by a single-ended signal line 364. An output of the output FIFO buffer 358 is coupled through a further single-ended signal line 366 to an input of a serializer circuit 368. The serializer circuit includes a differential output 370 coupled through a differential signal line 372 to a differential input of an output amplifier 374. An output of the output amplifier 374 forms a portion of output port 304, and is coupled to a further T-line 288 of a further media segment.

The bit-1 signal path includes a respective input amplifier 312, data synchronizer circuit 390, deserializer circuit 392, FIFO input buffer 394, FIFO output buffer 396, serializer circuit 398, and output amplifier 400, coupled to one another, and to the FIC circuit 340 in the same manner, and operating the same way, as the corresponding components of the bit-0 signal path.

As discussed above, a high speed clock signal is transmitted from node to node around the ring on a high-speed clock signal line 401. In another embodiment of the invention, the high speed clock signal is encoded into the data transmitted from node to node, so that no separate high speed clock signal line is needed. In one aspect of the invention any node on the ring may be arbitrarily selected to originate the clock signal for the ring. In another aspect of the invention, responsibility for clock generation may be passed from node to node depending, for example, on a timed interval. Alternately, the clock signal may originate from a clock circuit that is separate from any node. Also, every node may generate and output its own clock to be used in the ring segment over which the node is the master.

The FIC circuit also includes a data input 404 for receiving input data from the bit-1 data path, a control output 339 for controlling data flow out of the input FIFO buffer, and a data output 406 for outputting data to the bit-1 data path. A clock output 408 outputs a fourth clock signal, generated by the FIC, over a clock line 410 to a clock input 412 of an application circuit 414. In FIG. 4, "P", "Q" and "R" represent data path widths being routinely implemented according to the requirements of a particular application. A control input/output 416 outputs control signals over a P-bit wide control bus 418 data path to a control input/output 420 of the application circuit 414. An address input/output 422 outputs address signals over a Q-bit wide address bus 424 data path to an address input/output 426 of the application circuit 414, and a data input/output 428 of the FIC outputs data signals over an R-bit wide data bus 430 data path to a data input/output 432 of the application circuit 414.

Figure 5:
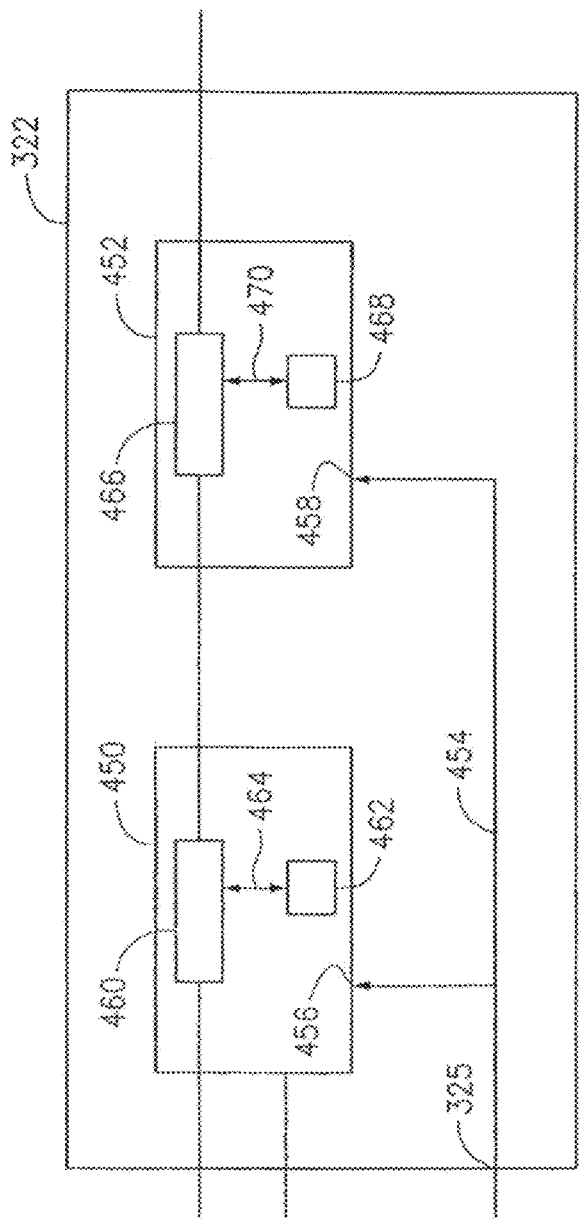
FIG. 5 shows an exemplary data synchronizer circuit in block diagram form according to one aspect of the invention.

FIG. 5 shows an exemplary data synchronizer circuit as in FIG. 4, in additional detail. The data synchronizer circuit (eg. 322) includes a phase alignment circuit 450, and a bit alignment circuit 452. A clock signal received at input 325 of the data synchronizer is coupled by a clock line 454 to a clock input 456 of the phase alignment circuit and a further clock input 458 of the bit alignment circuit.

The phase alignment circuit 450 includes an adjustable delay line 460 and a delay control circuit 462 bidirectionally coupled to the delay line at 464. In an alternate embodiment, a multi-tap delay line is used in place of the adjustable delay line 460. The bit-alignment circuit includes a shift register 466 and a bit control circuit 468 bidirectionally coupled to the shift register at 470.

Figure 6A:
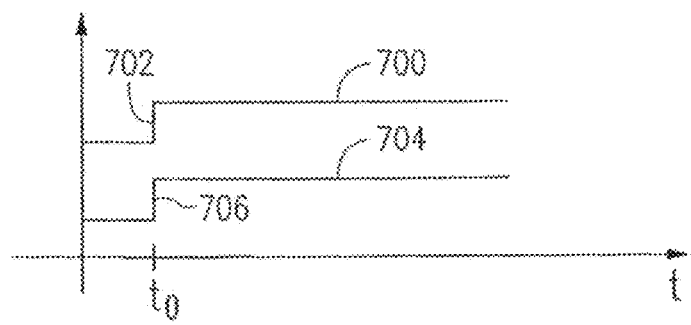
FIGS. 6A-F show data signal timing relationships according to one aspect of the invention.
Figure 6B:
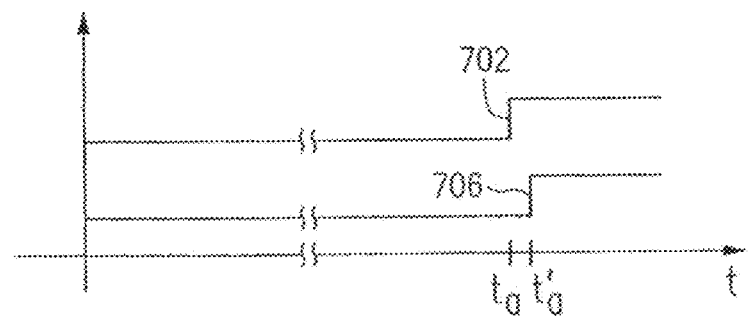

Together, the phase alignment circuit and the bit-alignment circuit act to correct for unequal signal transmission delays exhibited by signals conveyed by, for example, the bit-0 288 and bit-1 290 T-lines. As shown in FIG. 6A, a first signal 700 including a first signal transition 702 is transmitted on the bit-0 T-line 288. A second signal 704 including a second signal transition 706 is transmitted on the bit-1 T-line 290. At the input to a particular media segment, both the bit-0 transition and the bit-1 transition occur simultaneously at time $t_0$. Due to differences in the length and/or electrical characteristics of the bit-0 288 and bit-1 290 T-lines, the two transitions are no longer synchronized when they reach the output end of the media segment. This is shown in FIG. 6B where signal transition 702 arrives at a receiving node at time $t_a$ prior to the arrival of transition 706 at time $t_á$. In practice, such de-synchronization of signal transitions can cause data errors. Accordingly, it is the function of the phase alignment circuit to re-align the two signal transitions so as to insure data integrity.

Figure 6C:
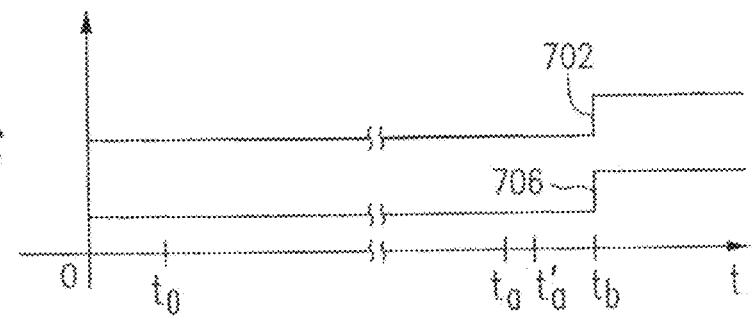

In FIG. 6C, the two signal transitions are shown realigned at time $t_b$, after having passed through the phase alignment circuit. In operation, a calibration cycle is executed during which respective bit-0 and bit-1 signal transitions known to be simultaneously issued are detected. Any media-induced delay is ascertained, and used to set a delay factor imposed by the delay line 460 that is applied to the bus channel with the smallest intrinsic delay (and thus the first-arriving signal). This delay factor remains in effect after the calibration cycle is complete, and acts to delay what would otherwise be early-arriving signal transitions so that a later-arriving signal has a chance to catch up. As would be understood in the art, calibration of the delay line may occur once or repeatedly, according to the stability of the transmission media and the requirements of the particular application.

Figure 6D:
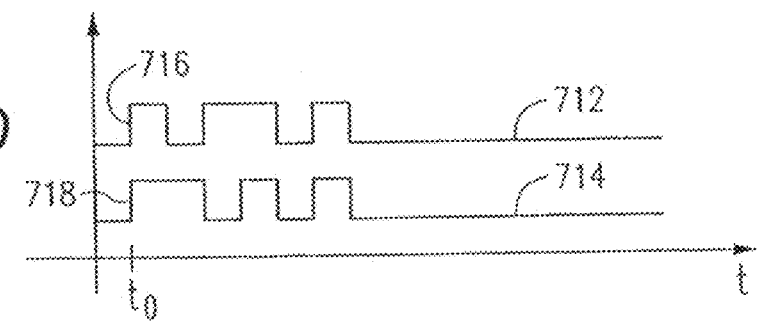
Figure 6E:
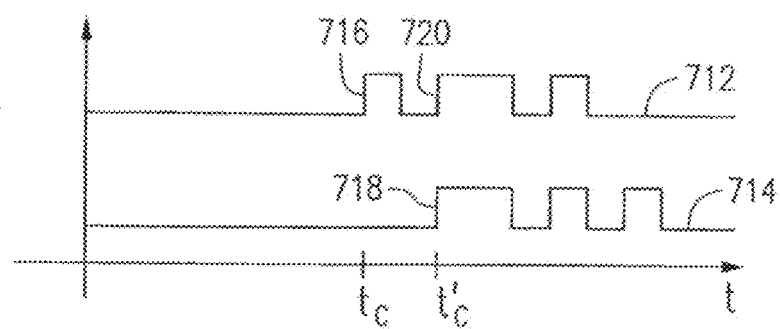
Figure 6F:
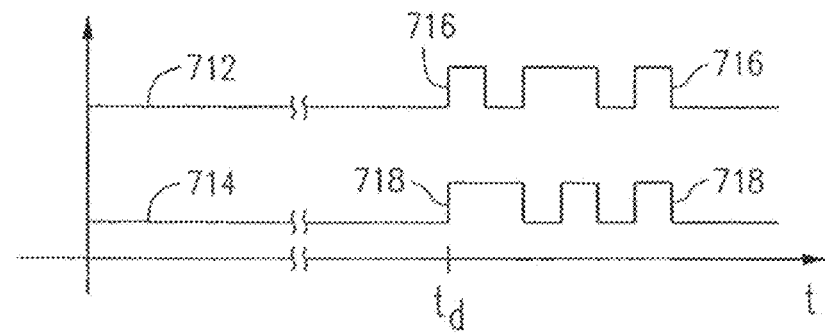

The bit-alignment circuit performs a function similar to that of the phase-alignment circuit, but at a bit/word level. Depending on the characteristics of the respective T-lines and the frequency of data transmission, the phase differential introduced during transmission over a particular media segment may exceed one bit-time. This effect is shown in the bit-0 line and bit-1 line signals shown in FIG. 6D which illustrates two signals (bit-0 712, bit-1 714) with respective first transitions 716, 718 transmitted at time $t_0$. In such a case, as shown in FIG. 6E, simple alignment of signal phase may not properly align the signals as transmitted. In FIG. 6E, one sees that excessive delay in the T-line bearing signal 714 causes transition 718 to arrive at a receiving node at time $t_c'$, well after transition 716 which arrives at the same node at time $t_c$. Consequently, after phase alignment (as described above) transition 718 aligns, incorrectly, with transition 720, rather than transition 716. The evident consequence is a loss of data integrity. Therefore, it is necessary to phase-shift incoming data signals sufficiently so as to insure that corresponding data bits of the bit-0 and bit-1 lines are processed simultaneously. This is achieved by shifting the phase-aligned signals from each T-line into respective shift registers, and tapping signals out of the respective shift register at respective points that eliminate the undesirable misalignment shown in FIG. 6E. FIG. 6F shows the shifted result with data signals both phase-aligned and bit-aligned at time $t_d$.

The operation of the FIG. 1 embodiment of the high speed ring/bus including nodes of the FIG. 4 embodiment will now be described in additional detail.

In general operation, an application circuit 414 of node A generates a message to be sent, for example to a corresponding application circuit 414 of node D. The data comprising the message to be sent is packaged in a packet structure including a header having origin and destination information along with information characterizing the payload of data (for example data length may be included, along with a CRC value that is used to confirm data integrity). The packet is transmitted over the wide, low-speed data bus 430 in words of width R from the application circuit to the FIC circuit 340 of node A. In the FIC circuit, inter-packet data may be added, such as error checking/correcting codes or other data further characterizing the complete packet, or supporting ring operation. Inter-packet data includes data that is added to the data stream passing around the high speed bus that is not part of the payload and headers of a regular packet. This data may be appended by the FIC circuit to a data packet prepared by an application circuit. Alternately, it may be a special packet originating with the FIC, and having a format that is like that of a regular packet, or completely different. In one aspect of the invention, repeated packet origin and destination information is included in this inter-packet data. The packaged data that was received (and optionally processed) by the FIC circuit in words of R bits wide is broken into words N-bits wide where N<R. These N-bit wide words are each allocated to one of a plurality of outgoing bit-streams. In the FIG. 4 embodiment, 2 bit streams are available (bit-1, bit-0). Accordingly, in a typical application according to FIG. 4, the relationship between the widths of lines 430 (R) and 354 (N) would be R=2×N. Proceeding along the bit-0 data path, data is then transferred in N-bit wide words over line 354 to the output FIFO buffer 358 which stores the data it receives as words of width N.

A clock signal is provided by the FIC circuit at its clock output 360, to the output FIFO buffer 358. Under the control of this clock signal, the output FIFO buffer 358 transfers data in N-bit words to the serializer 368. The serializer receives the data in N-bit wide words at a given clock rate and outputs the data at a clock rate N-times faster in a one-bit wide stream. Concurrently, along the bit-1 data path, data is passed out of the FIC circuit 340 in N-bit wide words, buffered in FIFO 396, and serialized into a one-bit wide output signal by serializer 398.

Output amplifiers 374 and 400 each amplify respective one-bit wide data signals and send the signals out over their respective T-lines (288, 290) of a media segment 102 coupled to node A 150 at output port 304. These bit-0 and bit-1 data signals are then received at input port 302 of node B. Specifically the bit-0 data stream is received at input 306 of amplifier 308 and the bit-1 data stream is received at input 310 of amplifier 312. The input amplifiers 308, 312 are designed in routine fashion to have an input impedance matched to the impedance of the respective T-line (288, 290) to which each is respectively coupled. This serves to minimize signal reflection. Also, in the illustrated embodiment, the respective amplifier inputs 306, 310 are implemented as differential inputs, preferably with a high common node rejection ratio (CMRR).

The bit-0 input amplifier 308 supplies an amplified copy of the data signal it receives to the bit-0 data synchronizer 322. Concurrently, the bit-1 input amplifier supplies an amplified bit-1 data signal to the bit-1 data synchronizer 390.

At the same time a clock signal is supplied to the two data synchronizers at their respective clock inputs 325, 326 by the clock divider and synchronization control circuit 329.

As described above in relation to FIG. 5, the data synchronizers 322, 390 perform a phase alignment and a bit alignment on the two data signals. Consequently, at the respective inputs of the respective deserializers 328 and 392, the bit-0 and bit-1 data streams are properly aligned. The two deserializers 328, 392 concurrently demultiplex the two incoming data signals from single bit wide signals into respective N-bit wide data streams.

The N-bit wide data streams are slowed by demultiplexing to a clock rate 1/N times as fast as the clock speed of the data found on the incoming T-line (at port 302). N-bit wide data is passed concurrently from deserializers 328, 392 to input FIFO buffers 332, 394 according to the clock signal provided on clock line 348. Each FIFO buffer, in turn, passes N-bit wide data to the FIC circuit 340 at inputs 338 and 404 for the bit-0 and bit-1 data streams respectively.

The FIC circuit 340 evaluates the incoming data to see whether it is destined for the instant node (here node B). If so, the data is passed to the local application circuit 414. If not, the data is passed through to the respective FIC outputs 352, 406 of the FIC circuit. In one embodiment of the invention, the determination of data destination is made by evaluating inter-packet data. In another embodiment of the invention, destination information from within the packet is evaluated to ascertain packet destination.

In the present example, the data being transmitted is destined for node D rather than node B, therefore the FIC circuit 340 will pass the data from its inputs 338, 404 to respective outputs 352, 406. However, if upon the arrival of the incoming data at inputs 338, 404, the FIC 340 is already sending data (for example, data that originated with the node B application circuit 414) then, in one aspect of the invention, the incoming data is buffered in the incoming FIFO buffers 332, 394 until transmission of the outgoing data (for a destined portion thereof, e.g., packet) is complete. Note that a portion of the incoming data stream may be buffered in additional registers coupled to FIC inputs 338, 404 within the FIC 340. Data stored within these additional registers may be evaluated for control purposes.

It should be noted that, in one aspect of the invention, a priority scheme is established such that incoming data may be prioritized over outgoing data. This prioritization may be controlled by a convention that always gives priority to incoming data, or alternately, by a comparison within the FIC circuit 340 of priority designation of data contained within the two incoming data streams. Note that the priority data may be contained within a packet, or may be transferred as inter-packet data that is generated by the FIC or the application circuit, depending on the particular application, and may be inserted in a data stream under hardware or software control.

The data output by node B on media segment 104 is received by node C, which performs the same functions detailed above with respect to node B. Again, the data is not destined for node C, and so it is passed through node C and transmitted over media segment 106 to node D. At node D, the input data is received, amplified, synchronized, deserialized, buffered and transferred to the FIC circuit 340. In the FIC circuit, the destination portion of the data stream is examined to ascertain that the current node is the destination node. The N-bit wide data words of the bit-0 data stream are then combined (typically concatenated) with the N-bit wide words of the bit-1 data stream to form, for example, R-bit wide data words that are passed over the local data line 430 to the node D application circuit 414.

Figure 7A:
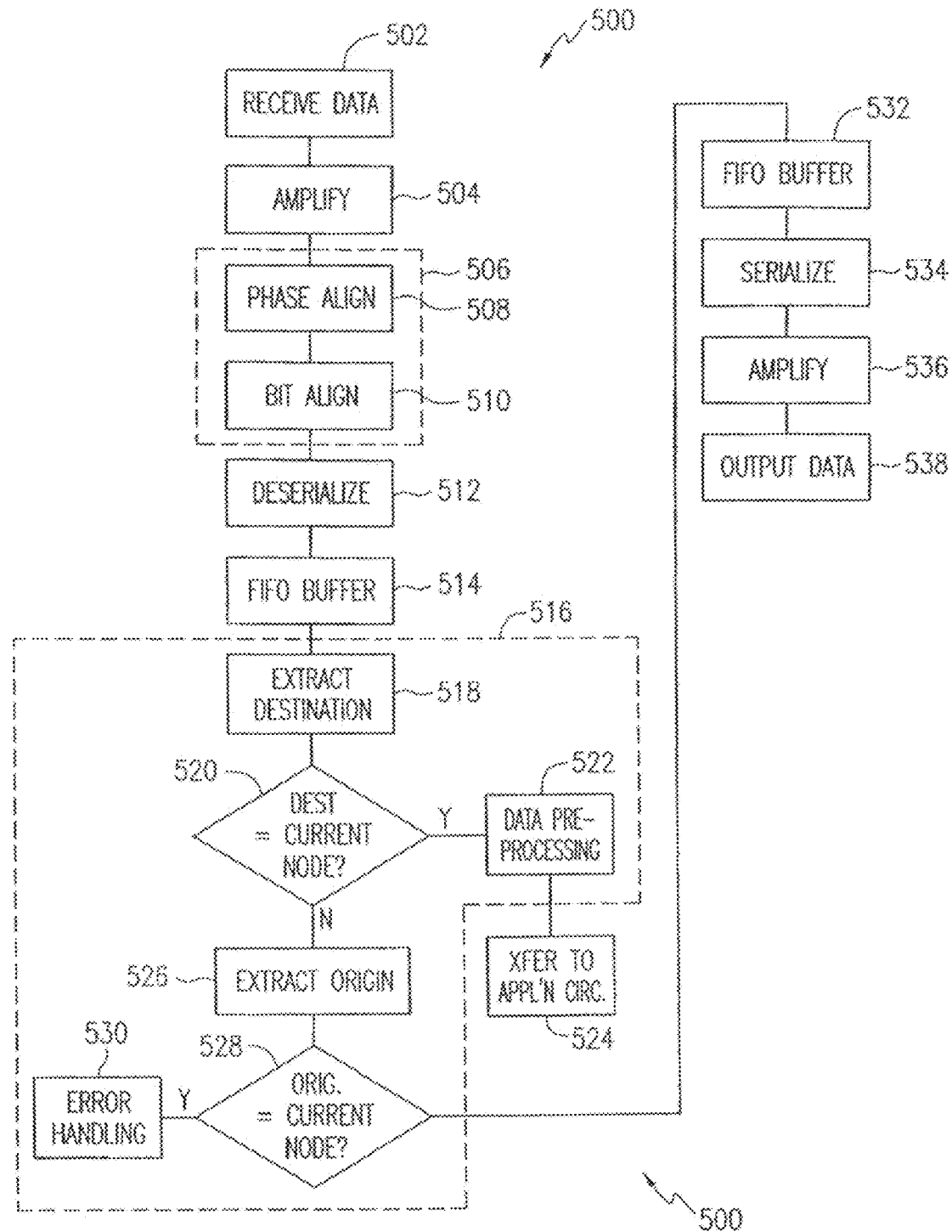
FIG. 7A shows a flow chart summarizing a portion of the operation of an exemplary node according to one aspect of the invention.

The flowchart of FIG. 7 summarizes a portion of the operation of a node with respect to signals received at input port 302, and shows the data processing portion 516 that takes place within the FIC circuit 340, as discussed above. The overall data stream routing process 500 includes receiving data 502 at a node. The data signal is received at a device with an input impedance matched to the media segment to which it is coupled for receiving. The data signal is then amplified 504 in an input amplifier that may have positive, negative, or unity gain as required by a particular application.

In a next step, plural data signals received on respective data paths are synchronized 506. This data synchronization includes phase alignment 508 and bit alignment 510, as previously described. Thereafter, the data signals are deserialized 512 by demultiplexing. This widens and correspondingly slows the data stream. The words of the wide data stream that results are stored 514 in a FIFO buffer. This allows the receipt of an incoming data stream while the FIC is otherwise occupied, e.g., with transmission of outgoing data originating at the present node. After storage in the FIFO buffer, data is evaluated and processed in the FIC at process segment 516. FIC processing includes evaluation of data destination information. The data destination is extracted 518 according to the format of the data. Typically, it is found in a packet header or in inter-packet data. Once extracted from the data stream, destination information is evaluated 520 to determine whether the present data (e.g., data packet) is destined for the current node. If so, any required pre-processing 522 such as removal of inter-packet data, stripping of packet headers, error checking/correction, and/or aggregation of data into wider parallel format, is performed. Thereafter, in one embodiment, data from the data stream is passed 524 over a correspondingly wide and slow data bus to a local user application circuit of the node.

As would be understood by one of skill in the art, one node of a high-speed bus according to the invention may serve as a gateway to one or more application circuits standing alone or configured in a wide variety of communication networks. Such communication networks may include further instances and embodiments of a communication system as described herein.

Referring again to FIG. 7A, in one embodiment of the invention, if the destination extracted 518 from the data stream does not match the current node, the node extracts origin information 526. In a ring structure embodiment of the invention, one possible failure mode is that information is not recognized by a destination node or is otherwise passed all the way around the ring to its originating node. Therefore in one aspect, the present node compares the extracted origin information to its own address 528 to confirm that the data has not inadvertently been passed all the way around the ring network without being accepted by a receiving node. If data is found to have completely traversed the ring, appropriate error handling may be applied 530. In an alternative embodiment, a data packet is always passed completely around the ring, e.g. to confirm ring integrity, while a copy of the data is left behind at the destination node. It should be noted that selection of the particular order in which the various information, such as origin and destination addresses within a data stream, is handled would be a matter of routine design for one of skill in the art. Moreover, the functions presented herein are merely exemplary of the data processing that would be performed to execute the data routing function of the FIC as characterized herein.

In the common case, where data of the data stream neither originated at, nor is destined for, the present node, the data stream is passed out of the FIC and stored 532 in the output FIFO buffer. This data stream may be an exact reproduction of the incoming stream as synchronized (at 506) or it may include network history information added by the FIC related to passage through the present node. The information of the data stream is held in the FIFO until it can be serialized 534 (i.e. multiplexed) into a narrower data stream with a correspondingly higher clock rate. The signal of this narrower data stream is then amplified 536 by an amplifier with an output impedance that is matched to the outgoing media segment and output 538 onto that media segment for transmission to the next sequential node.

Figure 7B:
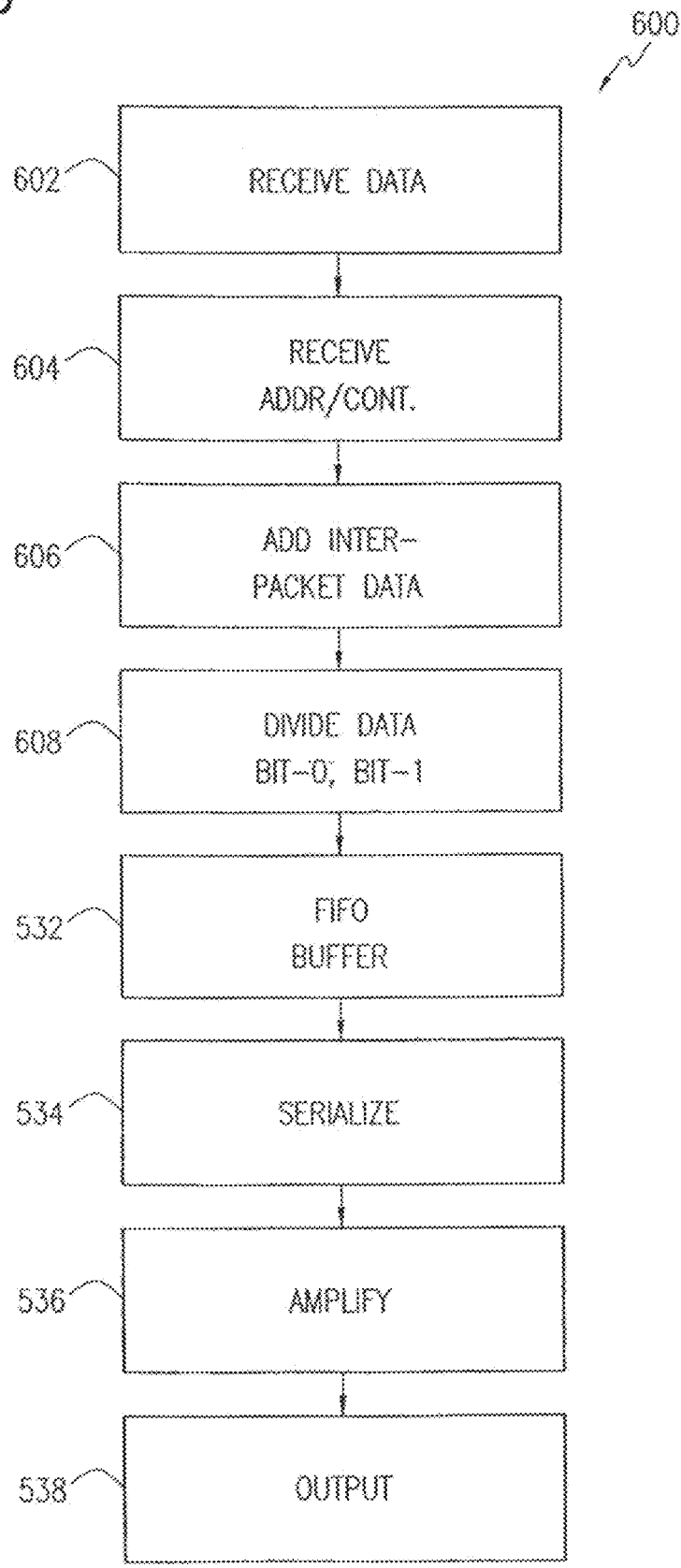
FIG. 7B shows a flow chart summarizing a portion of the operation of an exemplary node according to one aspect of the invention.

FIG. 7B shows a flow chart that summarizes the processing 600 of data originating at the application circuit 414 of a particular node. The data is received 602 (e.g. at input/output 428) of the FIC circuit. Typically, the data received is already configured in a data packet such as that described above in relation to FIG. 2. In addition, address and control data may be received 604 at respective input/outputs 422, 416 of the FIC circuit.

In one embodiment of the invention, the FIC circuit adds interpacket data 606 characterizing the packet (e.g. error checking/correction, transmission timestamp, etc.) to the packet data. The combined data packet and interpacket data form a data stream that is then divided into plural streams 608 according to the number of data bit streams of the media segment (two streams for the FIG. 4 embodiment). Next, the data is transferred 532 to the output FIFO buffer in N bit wide words. Thereafter, the data is serialized 534 in to one-bit wide data streams which are amplified 536 and output 538 onto the media segment connected at output port 304.

At this point, one should recognize that each node (A, B, C, D) controls the media segment (102, 104, 106, 108) connected at its respective output port 304. In one aspect, port 304 is unidirectional (outgoing) and only that node may send data on the media segment. Accordingly, there is no exchange of a control token, and no opportunity for signals to collide on the data bus. The inefficiencies of token ring and collision-based systems are thus avoided.

The system is a peer-to-peer system in the sense that each node is structurally and functionally similar to every other node of the ring. Each is the master of the media segment coupled at its output port 304 and the slave (with respect to receiving data) of the media segment at its input port 302.

Figure 8A:
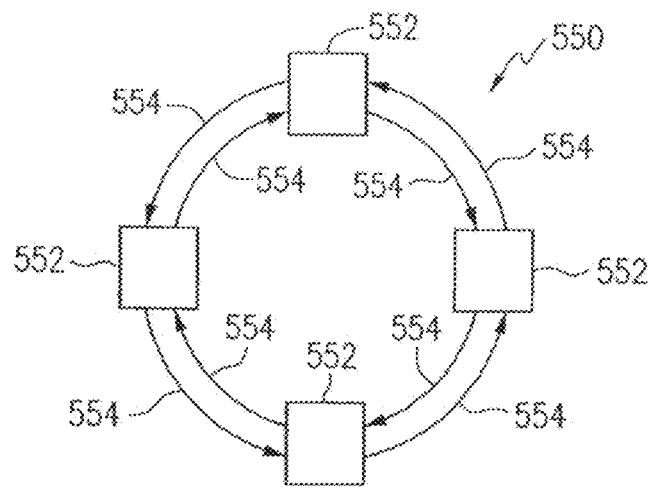
FIG. 8A shows an exemplary embodiment of a communication network according to the invention.
Figure 8B:
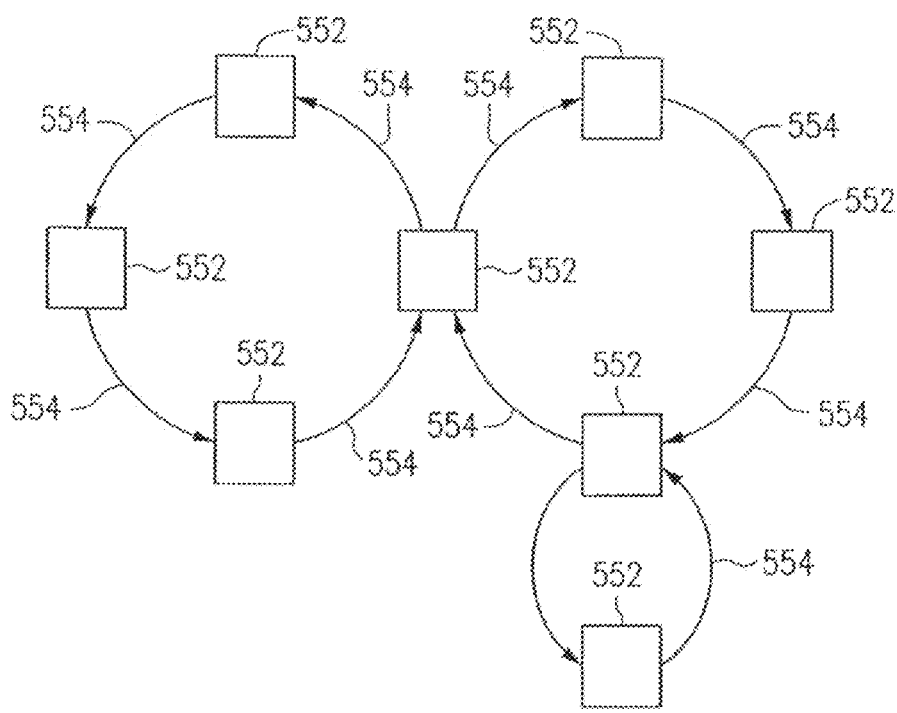
FIG. 8B shows an exemplary embodiment of a communication network according to the invention.

As is readily understood, the ring bus structure illustrated in FIG. 1 is only one of a wide variety of configurations that are routinely derived from the foregoing disclosure according to the requirements of a particular application. In other aspects, as shown in FIG. 8A, the invention includes a network 550 with plural counter directional rings including nodes 552 and media segments 554. Alternately, (for example), multiple linked rings may be configured as shown in FIG. 8B. A ring structure is not, however, required and linear or other configurations may be employed where unidirectional transmission is desired or, where a mechanism for reversing the direction of information flow, as necessary, is provided.

With respect to clocking of the system, while in one aspect the nodes operate as co-equals on a ring, one node may be designated to temporarily or permanently supply a clocking signal for the entire ring. Alternately, generation of the clock signal is a task that may be periodically assumed by different nodes. It is not, however, essential that a single clock signal be utilized by the entire network. Since each node controls its outgoing media segment, different clock signals may be employed on different media segments.

As alluded to above, one application for the high speed bus of the present invention is in the aggregation of a plurality of integrated circuit devices, e.g., memory devices, into a cooperating high speed unit. Thus, for example, multiple CAM devices may be configured to operate in coordinated fashion by communicating with one another according to the present invention. The invention is not so limited, however, and may be employed in a wide variety of data processing systems.

Figure 9:
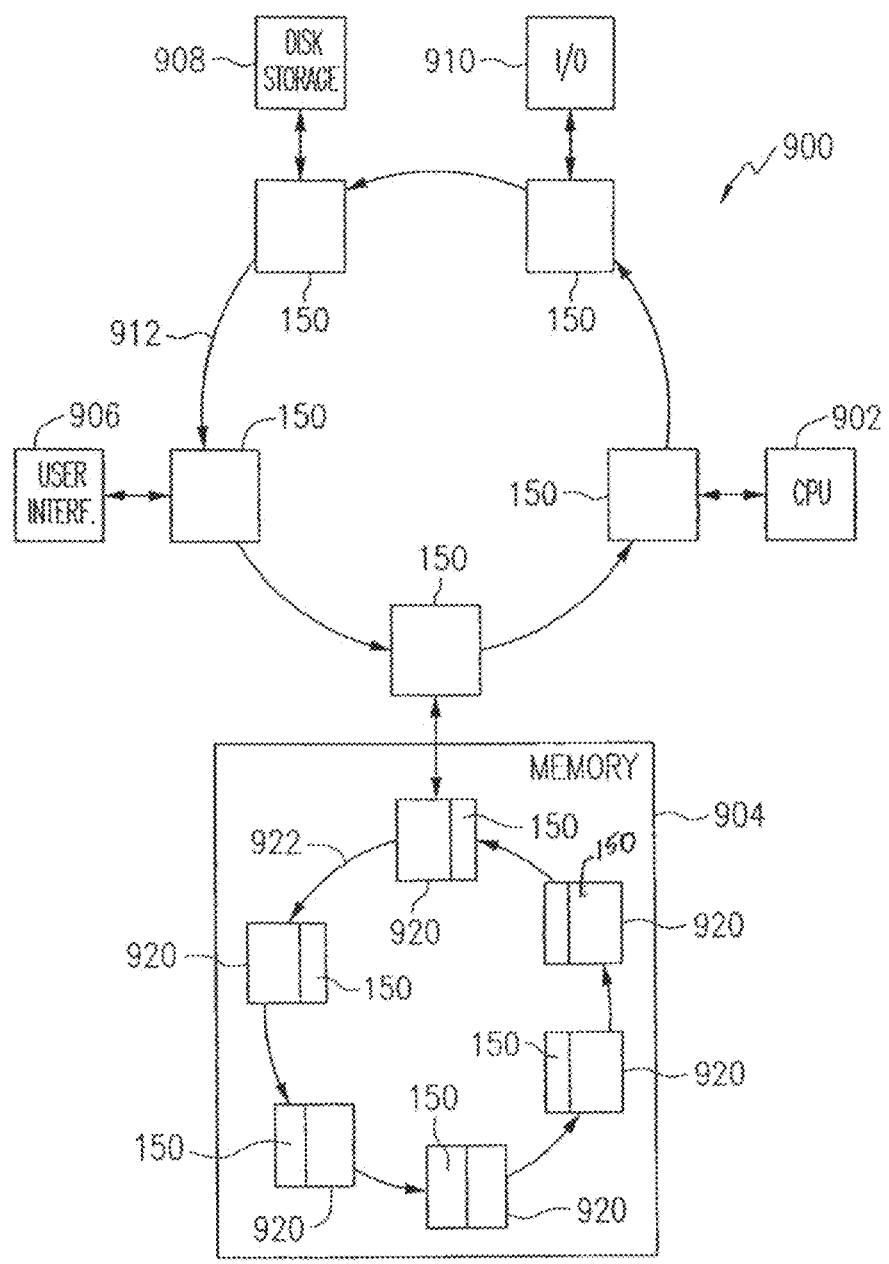
FIG. 9 shows a computer system including a memory prepared according to the invention.

FIG. 9, for example, shows a generalized digital system 900 in which processor, memory, and other components are spatially distributed and connected to one another by a high speed bus according to one aspect of the invention. Accordingly, a central processing unit 902, a memory unit 904, a user interface unit 906, a disk storage unit 908, and an I/O unit 910 are each coupled to the high speed bus 912 by respective nodes 150. Digital data is passed between the nodes according to a protocol routinely adapted from the foregoing disclosure to the requirements of the particular system illustrated.

According to a further aspect of the invention, the memory unit 904 includes a plurality of memory modules 920 (e.g. RAM integrated circuit devices, CAM integrated circuit devices, etc.) mutually coupled by a further high speed data bus 922. The memory modules 920 are each coupled to the further bus 922 by a node 150 which may be discrete from the memory device, or which alternately may be integrated with the memory module 920, as shown.

While preferred embodiments of the invention have been described in the illustrations above, it should be understood that these are exemplary of the invention and are not to be considered as limiting. Additions, deletion, substitution, and other modifications can be made without departing from the spirit or scope of the present invention. Accordingly, the invention is not to be considered as limited by the foregoing description but is only limited by the scope of the appended claims.

What is claimed as new and desired to be protected by Letters Patent of the United States is:

1. Computerized high-speed ring data bus apparatus, comprising:
    a plurality of computerized nodes;
    a plurality of data bus segments connecting each of the plurality of computerized nodes with two other of said plurality of computerized nodes so as to form a first data transport ring over which data can be communicated, at least one of the plurality of computerized nodes configured to generate a synchronization signal to which at least each of the other of the plurality of computerized nodes synchronize;
    a second data transport ring comprising a plurality of data bus segments, the second data transport ring configured for data transport counter-directional to a direction of data transport of the first data transport ring; and
    at least one application apparatus in data communication with at least one of the plurality of computerized nodes;
    wherein said computerized high-speed ring data bus apparatus is configured such that the data can be communicated over said first data transport ring by each of said plurality of computerized nodes to each other of said plurality of computerized nodes;
    wherein the at least one of the plurality of computerized nodes configured to generate a synchronization signal is further configured to cause transmission of the generated synchronization signal over said first, data transport ring for use by at least each of the other computerized nodes;
    wherein the data communicated over said first data transport ring comprises a plurality of data frames or packets each having a plurality of bytes, the plurality of bytes of at least one of the frames or packets comprising source identification data, the source identification data configured to identify one of the plurality of computerized nodes which issued the at least one frame or packet; and
    wherein the one of the plurality of computerized nodes which issued the at least one frame or packet is configured to utilize the source identification data to determine that the at least one frame or packet has traversed an entirety of the first data transport ring, the traversal of the entirety of the first data transport ring comprising a normal operational condition, the determination that the at least one frame or packet has traversed the entire data transport ring used by computerized high-speed ring data bus apparatus to confirm an integrity of the first data transport ring.

2. Computerized high-speed ring data bus apparatus, comprising:
    a plurality of computerized nodes;
    a plurality of data bus segments connecting each of the plurality of computerized nodes with two other of said plurality of computerized nodes so as to form a first data transport ring over which data can be communicated, at least one of the plurality of computerized nodes configured to generate a synchronization signal to which at least each of the other of the plurality of computerized nodes synchronize; and
    at least one application apparatus in data communication with at least one of the plurality of computerized nodes; and
    wherein said computerized high-speed ring data bus apparatus is configured such that the data can be communicated over said first data transport ring by each of said plurality of computerized nodes to each other of said plurality of computerized nodes;
    wherein the at least one of the plurality of computerized nodes configured to generate a synchronization signal is further configured to cause transmission of the generated synchronization signal over said first data transport ring for use by at least each of the other computerized nodes; and wherein the at least one of the plurality of computerized nodes configured to generate a synchronization signal comprises: (i) at least one receive differential signaling pair comprising first and second wire-based conductors that are part of a first bus segment; (ii) at least one output differential signaling pair comprising first and second wire-based conductors that are part of a second bus segment; and (iii) at least one amplifier apparatus in signal communication with at least one of the input and output differential signaling pairs, the at least one amplifier configured to cause amplification of at least a portion of a data signal received via the input differential signaling pair, or a data signal transmitted via the output differential signaling pair, respectively.

3. The computerized high-speed ring data bus apparatus of claim 2, further comprising at least one second data transport ring comprising a second plurality of data bus segments, the at least one second data transport ring configured for data communication with at least the at least one of the plurality of computerized nodes configured to generate a synchronization signal.

4. The computerized high-speed ring data bus apparatus of claim 2, further comprising a second data transport ring comprising a plurality of second data bus segments, the second data transport ring configured for data transport counter-directional to a direction of data transport of the first data transport ring.

5. The computerized high-speed ring data bus apparatus of claim 4, wherein the second data transport ring comprises a plurality of second computerized nodes each disposed between two of the second data bus segments of the second data transport ring, the plurality of second computerized nodes each disposed between two of the second data bus segments of the second data transport ring also comprising respective, corresponding ones of the plurality of computerized nodes of the first data transport ring.

6. The computerized high-speed ring data bus apparatus of claim 2, wherein:
the data communicated over said first data transport ring comprises a plurality of data frames or packets each having a plurality of bytes, the plurality of bytes of at least one of the frames or packets comprising source identification data, the source identification data configured to identify one of the plurality of computerized nodes which issued the at least one frame or packet.

7. The computerized high-speed ring data bus apparatus of claim 2, wherein the communication of the data over said first data transport ring by each of said plurality of computerized nodes to each other of said plurality of computerized nodes comprises communication of payload data without data collision or use of a collision detection mechanism or a token.

8. The computerized high-speed ring data bus apparatus of claim 2, further comprising an apparatus configured to compensate for timing distortions, the timing distortions introduced by one or more of the data bus segments.

9. The computerized high-speed ring data bus apparatus of claim 8, wherein the compensation for the timing distortions comprises phase compensation apparatus.

10. The computerized high-speed ring data bus apparatus of claim 8, wherein the compensation for the timing distortions comprises hit-wise error compensation apparatus.

11. The computerized high-speed ring data bus apparatus of claim 2, wherein the at least one of the plurality of computerized nodes in data communication with the at least one application apparatus comprises an interface and control (IC) circuit configured to at least provide a data interface between the at least one application apparatus and the first data transport ring.

12. The computerized high-speed ring data bus apparatus of claim 11, wherein:
the data communicated over said first data transport ring comprises a plurality of data frames or packets each having a plurality of bytes, the plurality of bytes of at least one of the frames or packets comprising priority data, the priority data useful to a receiving one of the plurality of computerized nodes in prioritizing the plurality of packets or frames relative to at least one other plurality of packets or frames received by the receiving one of the computerized nodes.

13. The computerized high-speed ring data bus apparatus of claim 11, wherein:
the data communicated over said first data transport ring comprises a plurality of data frames or packets each having a plurality of bytes; and
priority data is inserted between at least two of the plurality of packets or frames, the priority data useful to a receiving one of the plurality of computerized nodes in prioritizing the plurality of packets or frames relative to at least one other plurality of packets or frames received by the receiving one of the computerized nodes.

14. The computerized high-speed ring data bus apparatus of claim 11, wherein the data interface between the at least one application apparatus and the first data transport ring comprises at least: (i) a payload or application data interface comprising at least one data bus; and (i) a control data interface comprising at least one data bus.

15. The computerized high-speed ring data bus apparatus of claim 14, wherein the payload or application data interface comprises at least one timing base used to transfer payload or application data between the at least one application apparatus and the IC circuit, the at least one timing base being different than a timing base associated with the synchronization signal.

16. The computerized high-speed ring data bus apparatus of claim 14, wherein an output data bus segment of the first data transport ring is in data communication with the IC circuit, the output data bus segment comprising at least one differentially signaled pair of optical or electrical signal conductors, the at least one differentially signaled pair configured to transmit a serialized bitstream derived from at least (i) payload or application data transferred over the payload or application data interface, and (ii) control data transferred over the control data interface, at least portions of the payload or application data and control data contained in a common packet or frame structure formed at least partly within the serialized bitstream.

17. Computerized high-speed ring data bus apparatus, comprising:
a plurality of computerized nodes, at least one of the plurality of computerized nodes configured to generate a synchronization signal to which at least each of the other of the plurality of computerized nodes synchronize;
a plurality of data bus segments connecting each of the plurality of computerized nodes with two other of said plurality of computerized nodes so as to form a first data transport ring over which data can be communicated, the data bus segments each comprising at least two wire-based conductors configured as a differential signaling pair; and at least one application apparatus in data communication with at least one of the plurality of computerized nodes; and an apparatus configured to compensate for timing distortions, the timing distortions introduced by one or more of the data bus segments;

wherein said computerized high-speed ring data bus apparatus is configured such that the data can be communicated over said first data transport ring by each of said plurality of computerized nodes to each other of said plurality of computerized nodes;

wherein the at least one of the plurality of computerized nodes configured to generate a synchronization signal is further configured to cause transmission of the generated synchronization signal over said first data transport ring for use by at least each of the other computerized nodes; and wherein the timing distortions introduced by the one or more of the data bus segments comprise timing distortions introduced based on differences in at least one of: (i) a length of a first of the at least two wire-based conductors and a length of a second of the at least two wire-based conductors, and/or (ii) at least one electrical characteristic of the first of the at least two wire-based conductors and at least one electrical characteristic of the second of the at least two wire-based conductors.

18. The computerized high-speed ring data bus apparatus of claim 17, wherein the compensation for the timing distortions comprises phase compensation apparatus.

19. The computerized high-speed ring data bus apparatus of claim 17, wherein the compensation for the timing distortions comprises bit-wise error compensation apparatus.

20. Computerized high-speed ring data bus apparatus, comprising:

a plurality of computerized nodes;

a plurality of data bus segments connecting each of the plurality of computerized nodes with two other of said plurality of computerized nodes so as to form a first data transport ring over which data can be communicated, at least one of the plurality of computerized nodes configured to generate a synchronization signal to which at least each of the other of the plurality of computerized nodes synchronize; and at least one application apparatus in data communication with at east one of the plurality of computerized nodes; and wherein said computerized high-speed ring data bus apparatus is configured such that the data can be communicated over said first data transport ring by each of said plurality of computerized nodes to each other of said plurality of computerized nodes;

wherein the at least one of the plurality of computerized nodes configured to generate a synchronization signal is further configured to cause transmission of the generated synchronization signal over said first data transport ring for use by at least each of the other computerized nodes;

wherein the at least one of the plurality of computerized nodes in data communication with the at least one application apparatus comprises an interface and control (IC) circuit configured to at least provide a data interface between the at least one application apparatus and the first data transport ring;

wherein the data communicated over said first data transport ring comprises a plurality of data frames or packets each having a plurality of bytes, the plurality of bytes of at least one of the frames or packets comprising source identification data, the source identification data configured to identify one of the plurality of computerized nodes which issued the at least one frame or packet; and wherein the one of the plurality of computerized nodes which issued the at least one frame or packet is configured to utilize the source identification data to determine that the at least one frame or packet has traversed an entirety of the first, data transport ring, and remove the at least one frame or packet from the first data transport ring.

21. The computerized high-speed ring data bus apparatus of claim 20, wherein the IC circuit is configured to add data relating a destination address on the first data transport ring to the data communicated over said first data transport ring, the destination address associated with an application process in data communication with at least one of the plurality of computerized nodes.

22. The computerized high-speed ring data bus apparatus of claim 21, wherein the addition of data relating a destination address on the data transport ring to the data communicated over said data transport ring comprises insertion of data into a header portion of one or more packets or frames generated by the IC circuit for transmission on the first data transport ring.

23. The computerized high-speed ring data bus apparatus of claim 22, wherein the one or more packets or frames each comprise payload data to be utilized by the application process, the payload data comprising a plurality of bytes, at least a first portion of the plurality of bytes transmitted over at least one output differential signaling pair of the at least one node comprising the IC circuit, the at least one output differential signaling pair comprising first and second signal conductors; and at least one amplifier apparatus in signal communication with the output differential signaling pair, the at least one amplifier configured to cause amplification of at least a portion of the one or more packets or frames prior to transmission thereof.

24. The computerized high-speed ring data bus apparatus of claim 20, wherein the plurality of bytes of at least one of the frames or packets comprises priority data, the priority data useful to a receiving one of the plurality of computerized nodes in prioritizing the plurality of packets or frames relative to at least one other plurality of packets or frames received by the receiving one of the computerized nodes.

25. The computerized high-speed ring data bus apparatus of claim 20, wherein priority data is inserted between at least two of the plurality of packets or frames, the priority data useful to a receiving one of the plurality of computerized nodes in prioritizing the plurality of packets or frames relative to at least one other plurality of packets or frames received by the receiving one of the computerized nodes.

26. Computerized high-speed ring data bus apparatus, comprising:

a plurality of computerized nodes;

a plurality of data bus segments connecting each of the plurality of computerized nodes with two other of said plurality of computerized nodes so as to form a first data transport ring over which data can be communicated, at least one of the plurality of computerized nodes configured to generate a synchronization signal to which at least each of the other of the plurality of computerized nodes synchronize; and at least one application apparatus in data communication with at least one of the plurality of computerized nodes; and wherein said computerized high-speed ring data bus apparatus is configured such that the data can be communicated over said first data transport ring by each of said plurality of computerized nodes to each other of said plurality of computerized nodes;

wherein the at least one of the plurality of computerized nodes configured to generate a synchronization signal is further configured to cause transmission of the generated synchronization signal over said first data transport ring for use by at least each of the other computerized nodes;

wherein the at least one of the plurality computerized nodes in data communication with the at least one application apparatus comprises an interface and control (IC) circuit configured to at least provide a data interface between the at least one application apparatus and the first data transport ring;

wherein the data interface between the at least one application apparatus and the first data transport ring comprises at least: (i) a payload or application data interface comprising at least one data bus; and (i) a control data interface comprising at least one data bus;

wherein the payload or application data interface comprises at least one timing base used to transfer payload or application data between the at least one application apparatus and the IC circuit, the at least one timing base being different than a timing base associated with the synchronization signal;

wherein the at least one timing base used to transfer payload or application data between the at least one application apparatus and the IC circuit is slower than the timing base associated with the synchronization signal; and wherein the data bus segments each comprise at least one differentially signaled pair of optical or electrical signal conductors, the at least one differentially signaled pair configured to transmit a serialized bitstream derived from at least the transferred payload or application data.

27. Computerized apparatus for use in a synchronous data ring network, the computerized apparatus comprising:

an application apparatus comprising:
a plurality of data bus interfaces; and
computerized logic in data communication with the plurality of data bus interfaces and configured to generate data packets comprised of one or more of payload data, address data, and control data and cause transmission of the generated data packets via one or more of the plurality of data bus interfaces; and computerized interface and control (IC) apparatus in data communication with the plurality of data bus interfaces and configured to at least provide a data interface between the application apparatus and a data transport ring of the synchronous data ring network, the computerized IC apparatus comprising:
at least one receive port in data communication with a first data bus segment of the data transport ring, the at least one receive port configured to receive serialized data transmitted over the first data bus segment; and
at least one transmit port in data communication with a second data bus segment of the data transport ring, the at least one transmit port configured to transmit serialized data over the second data bus segment;

wherein the computerized IC apparatus is further configured to:
receive transmitted ones of the generated data packets;
utilize the one or more of the payload data, address data, and control data of the received generated data packets to generate one or more synchronous frame structures for transmission via the at least one transmit port;
insert source identification data into the one or more synchronous frame structures;
receive the one or more synchronous frame structures via the at least one receive port after transmission thereof onto the data transport ring;
extract the inserted source identification data from the received one or more synchronous frame structures; and
utilize the extracted source identification data to cause removal of the received one or more synchronous frame structures from the data transport ring.

28. The computerized apparatus of claim 27, wherein the computerized IC apparatus is further configured to:
receive at least one data frame via the at least one receive port;
process the received at least one data frame to identify address data therein;
evaluate the identified address data to determine whether the at least one data frame is addressed to the application apparatus or a process thereof;
based on the determination indicating that the at least one data frame is addressed to the application apparatus or a process thereof, processing at least portions of the received at least one data frame to enable forwarding of at least payload data of the received at least one data frame to the application apparatus or process thereof via at least one of the plurality of data bus interfaces.

29. The computerized apparatus of claim 27, wherein:
the computerized IC apparatus further comprises amplification apparatus in signal communication with at least one of (i) the at least one receive port, and (ii) the at least one transmit port; and
the computerized IC apparatus is further configured to:
receive at least one data frame via the at least one receive port;
process the received at least one data frame to identify address data therein;
evaluate the identified address data to determine whether the at least one data frame is addressed to the application apparatus or a process thereof;
cause amplification of at least a portion of the received at least one data frame; and
cause transmission of the amplified at least the at least portion of the received at least one data frame via the at least one transmit port.

30. The computerized apparatus of claim 27, wherein the computerized IC apparatus is further configured to:
receive at least one data frame via the at least one receive port;
extract a synchronization signal from the received at least one data frame;
de-frame the received at least one data frame to obtain data contained in one or more fields of the at least one data frame;
utilize at least a portion of the obtained data to evaluate the condition of the at least one data frame;
utilize at least a portion of the obtained data to identify the application apparatus or a process thereof as the intended recipient of payload data within the received at least one data frame; and cause forwarding of at least the payload data to the application apparatus or process thereof via at least one of the plurality of data bus interfaces.

31. The computerized apparatus of claim 27, wherein the computerized IC apparatus is further configured to:
generate and insert a synchronization signal for use by a plurality of computerized nodes of the data transport ring into the one or more synchronous frame structures;
insert error detection or correction data into the one or more synchronous frame structures; and
insert payload length data into the one or more synchronous frame structures.

32. The computerized apparatus of claim 27, further comprising second computerized interface and control (IC) apparatus, the second computerized IC apparatus in data communication with the plurality of data bus interfaces and configured to at least provide a second data interface between the application apparatus and a second data transport ring of the synchronous data ring network, the second computerized IC apparatus comprising:
at least one second receive port in data communication with a first data bus segment of the second data transport ring, the at least one second receive port configured to receive serialized data transmitted over the first data bus segment of the second data transport ring; and
at least one second transmit port in data communication with a second data bus segment of the second data transport ring, the at least one second transmit port configured to transmit serialized data over the second data bus segment of the second data transport ring;
wherein the second computerized IC apparatus is further configured to receive transmitted ones of the generated data packets, and utilize the one or more of the payload data, address data, and control data of the received generated data packets to generate one or more second synchronous frame structures for transmission via the at least one second transmit port of the second computerized IC apparatus onto the second data transport ring.

33. The computerized apparatus of claim 32, wherein the transmission of the second one or more synchronous frame structures onto the second data transport ring comprises transmission onto the second data transport ring in a direction opposite to that of the transmission of the one or more synchronous frame structures onto the data transport ring by the computerized IC apparatus.

34. The computerized apparatus of claim 27, wherein the at least one receive port and the at least one transmit port are each configured for data communication with the first and second bus segments, respectively, via at least one differentially signaled electrical or optical conductor pair.

35. A method of processing data within a computerized ring network apparatus having a plurality of computerized nodes, a plurality of data bus segments connecting the plurality of computerized nodes to form a data transport ring, an application apparatus in data communication with one computerized node of the plurality of computerized nodes, and an interface and control (IC) apparatus in data communication with the application apparatus, the method comprising:
transmitting packet data from the application apparatus to the one computerized node via at least one data interface between the application apparatus and the one computerized node, the transmitted packet data comprising payload data, control data, and address data;
processing the transmitted packet data to cause placement of the payload data, control data, and address data within respective ones of prescribed fields within at least one data frame structure;
causing transmission of at least a portion of the at least one data frame structure as a serialized bitstream over at least one of the plurality of data bus segments via at least one differentially signaled pair of optical or electrical conductors;
inserting, via the IC apparatus, source identification data into the at least one data frame structure, the source identification data configured to identify one of the plurality of computerized nodes which issued the at least one data frame structure; and
utilizing, via the one of the plurality of computerized nodes Which issued the at least one data frame structure, the source identification data to determine that the at least one data frame structure has traversed an entirety of the data transport ring, the traversal of the entirety of the data transport ring comprising a normal operational condition, the determination that the at least one data frame structure has traversed the entire data transport ring used by the computerized ring network apparatus to cause subsequent processing of the at least one data frame structure.

36. The method of claim 35, wherein the computerized ring network apparatus comprises a synchronous computerized ring network apparatus, and the method further comprises causing transmission, from one of the plurality of computerized nodes, of a synchronization signal, the synchronization signal being configured to be used by at least all other ones of the plurality of computerized nodes to synchronize at least one of reception and transmission of the at least one data frame structure so as to avoid data collisions on any of the plurality of data bus segments.

37. The method of claim 36, wherein the causing transmission, from the one of the plurality of computerized nodes, of the synchronization signal comprises causing insertion of the synchronization signal by the one of the plurality of computerized nodes into the at least one data frame structure prior to the transmission thereof.

38. The method of claim 36, wherein the causing transmission, from the one of the plurality of computerized nodes, of the synchronization signal comprises causing insertion of the synchronization signal by the one of the plurality of computerized nodes into an inter-frame data structure prior to the transmission of the at least one data frame structure.

39. The method of claim 35, wherein the causing transmission of the at least the portion of the at least one data frame structure as the serialized bitstream via the at least one differentially signaled pair of optical or electrical conductors comprises causing transmission of the at least the portion of the at least one data frame structure via at least two differentially signaled pairs of optical or electrical conductors as at least two respective serialized bitstreams, the at least two respective serialized bitstreams transmitted in parallel.

40. The method of claim 35, wherein the transmitting packet data comprising address data comprises: transmitting packet data comprising address data associated with an application process in data communication with another one of the computerized nodes.

41. The method of claim 40, Wherein the address data associated with the application process in data communication with the another one of the computerized nodes comprises a MAC (media access control) layer address.

42. The method of claim 35, further comprising:
removing, via the one of the plurality of computerized nodes which issued the at least one data frame structure, the at least one data frame structure from the data transport ring.

43. The method of claim 35, wherein the transmitting packet data from the application apparatus to the one computerized node via the at least one data interface between the application apparatus and the one computerized node, the transmitted packet data comprising the payload data, control data, and address data, comprises:
transmitting the payload data from the application apparatus to the one computerized node via a payload data interface between the application apparatus and the one computerized node;
transmitting the control data from the application apparatus to the one computerized node via a control data interface between the application apparatus and the one computerized node; and
transmitting the address data from the application apparatus to the one computerized node via an address data interface between the application apparatus and the one computerized node.

* * * * *